United States Patent
Resnick

(10) Patent No.: US 8,364,679 B2
(45) Date of Patent: Jan. 29, 2013

(54) METHOD, SYSTEM, AND APPARATUS FOR DELIVERING QUERY RESULTS FROM AN ELECTRONIC DOCUMENT COLLECTION

(75) Inventor: Jason David Resnick, Alexandria, VA (US)

(73) Assignee: CPA Global Patent Research Limited, St. Helier (GB)

( * ) Notice: Subject to any disclaimer, the term of this patent is extended or adjusted under 35 U.S.C. 154(b) by 432 days.

(21) Appl. No.: 12/561,516

(22) Filed: Sep. 17, 2009

(65) Prior Publication Data

US 2011/0066612 A1  Mar. 17, 2011

(51) Int. Cl.
G06F 17/30 (2006.01)

(52) U.S. Cl. .............. 707/737; 707/748; 707/758

(58) Field of Classification Search .......... 707/737, 707/748, 758, 765, 707, 713, 760
See application file for complete search history.

(56) References Cited

U.S. PATENT DOCUMENTS

| | | | |
|---|---|---|---|
| 5,408,655 A | 4/1995 | Oren et al. | |
| 6,012,053 A * | 1/2000 | Pant et al. | 1/1 |
| 6,065,005 A | 5/2000 | Gal et al. | |
| 6,065,007 A | 5/2000 | Muthukrishnan et al. | |
| 6,240,408 B1 | 5/2001 | Kaufman | |
| 6,286,000 B1 | 9/2001 | Apte et al. | |
| 6,377,945 B1 | 4/2002 | Risvik | |
| 6,389,418 B1 | 5/2002 | Boyack et al. | |
| 6,556,992 B1 | 4/2003 | Barney et al. | |
| 6,665,656 B1 | 12/2003 | Carter | |
| 6,847,966 B1 | 1/2005 | Sommer et al. | |
| 7,114,147 B2 | 9/2006 | Ballantyne et al. | |
| 7,346,604 B1 | 3/2008 | Bharat et al. | |
| 7,376,635 B1 * | 5/2008 | Porcari et al. | 1/1 |
| 2001/0014852 A1 | 8/2001 | Tsourikov et al. | |
| 2002/0062302 A1 | 5/2002 | Oosta | |
| 2002/0073236 A1 | 6/2002 | Helgeson et al. | |
| 2002/0099685 A1 | 7/2002 | Takano et al. | |
| 2002/0099694 A1 | 7/2002 | Diamond et al. | |
| 2002/0138529 A1 | 9/2002 | Yang-Stephens et al. | |
| 2002/0152190 A1 | 10/2002 | Biebesheimer et al. | |
| 2003/0217056 A1 | 11/2003 | Allen et al. | |
| 2004/0015783 A1 | 1/2004 | Lennon et al. | |
| 2004/0039734 A1 * | 2/2004 | Judd et al. | 707/3 |

(Continued)

FOREIGN PATENT DOCUMENTS

| | | | |
|---|---|---|---|
| EP | 1122652 A1 | 8/2001 | |
| EP | 1930816 A1 | 6/2008 | |

(Continued)

*Primary Examiner* — Phong Nguyen
*Assistant Examiner* — Dennis Myint
(74) *Attorney, Agent, or Firm* — Kendal M. Sheets

(57) ABSTRACT

A method, system, and article are provided for efficiently and effectively searching an electronic document collection. Each of the documents in the collection is pre-divided into subsections. One or more profiles are created, each including a selection of at least one of the sections of the documents in the collection. In addition, a weight is assigned to each of the selected sections in the profile. Based upon the parameters of a query and selection of a profile, select sub-sections of each document are employed to compare query data to the underlying document collection. A compilation of documents is created with data matching the query data, and a relevancy score is computed for each document in the compilation. The relevancy score is then leveraged to sort the documents in a manner to convey relevancy to the query submission.

35 Claims, 11 Drawing Sheets

U.S. PATENT DOCUMENTS

| | | |
|---|---|---|
| 2004/0111438 A1 | 6/2004 | Chitrapura et al. |
| 2004/0172387 A1 | 9/2004 | Dexter et al. |
| 2004/0267717 A1* | 12/2004 | Slackman .................. 707/3 |
| 2005/0060297 A1 | 3/2005 | Najork |
| 2005/0060310 A1 | 3/2005 | Tong et al. |
| 2005/0192955 A1 | 9/2005 | Farrell |
| 2005/0210008 A1 | 9/2005 | Tran et al. |
| 2005/0228778 A1 | 10/2005 | Perrone |
| 2006/0020583 A1 | 1/2006 | Baranov et al. |
| 2006/0074907 A1 | 4/2006 | Singhal et al. |
| 2006/0085401 A1 | 4/2006 | Anderson et al. |
| 2006/0117252 A1 | 6/2006 | Du et al. |
| 2006/0294060 A1 | 12/2006 | Masuyama |
| 2007/0088695 A1 | 4/2007 | Bleyendaal et al. |
| 2007/0219980 A1 | 9/2007 | Songfack |
| 2007/0294232 A1 | 12/2007 | Gibbs et al. |
| 2008/0005103 A1 | 1/2008 | Ratcliffe et al. |
| 2008/0082352 A1 | 4/2008 | Schmidtler et al. |
| 2008/0154847 A1 | 6/2008 | Chellapilla et al. |
| 2008/0154848 A1 | 6/2008 | Haslam et al. |
| 2008/0228752 A1 | 9/2008 | Huang et al. |
| 2008/0288489 A1 | 11/2008 | Kim |
| 2008/0301138 A1 | 12/2008 | Hasan et al. |
| 2009/0228777 A1* | 9/2009 | Henry et al. .................. 715/230 |
| 2009/0282021 A1* | 11/2009 | Bennett ......................... 707/5 |

FOREIGN PATENT DOCUMENTS

| | | |
|---|---|---|
| WO | 03067428 A2 | 8/2003 |
| WO | 2007149623 A2 | 12/2007 |
| WO | 2008127338 A1 | 10/2008 |
| WO | 2009074878 A2 | 6/2009 |
| WO | 2009074878 A3 | 8/2009 |

* cited by examiner

METHOD, SYSTEM, AND APPARATUS FOR DELIVERING QUERY RESULTS FROM AN ELECTRONIC DOCUMENT COLLECTION

BACKGROUND OF THE INVENTION

1. Technical Field

This invention relates to an electronic document collection, submitting a query to the collection, and presenting query results. More specifically, the invention relates to creating search profiles by placing an emphasis on each section of an intellectual property document to be searched, and presenting the query results based upon relevancy of returned query results to at least one of the search profiles.

2. Description of the Prior Art

All intellectual property documents submitted for examination before any of a worldwide selection of patent offices, hereinafter Patent Office, must meet certain requirements, including, each intellectual property document must be deemed new, useful, and non-obvious. To properly prepare an intellectual property document for examination, it is useful to have knowledge of prior intellectual property documents, i.e. prior art, in related areas of technology as only one patent may be granted per invention. The process of ascertaining prior art is known as a search. The results of the search generally help the drafters of any subsequent intellectual property application to focus their efforts on what appears to be patentable or otherwise protectable subject matter and aids in developing a reasonable strategy for achieving the goals of the inventor or owner of the intellectual property rights.

Prior to the evolution of technology in the current electronic information age, it was known that intellectual property searches were conducted manually. A searcher would review a disclosure and based upon a classification system, ascertain where the disclosure should be classified, and thereafter conduct a search of documents and records within the classification. It was recognized that the searcher would visually review appropriate sections of the intellectual property document based upon the defined scope of the search being conducted. With the advent of information technology, manual searches are no longer available in most jurisdictions as most intellectual property grants and published applications are only available in electronic form. With the advent of the electronic format of the intellectual property document, similar strategies employed with the manual search may be used for searching an electronic intellectual property database.

Different classes of searches may be commissioned to achieve different results. For example, a novelty search may be commissioned to ascertain whether or not to submit a filing for an intellectual property asset. A product clearance search may be commissioned to ascertain whether a product is covered under the claims of a current intellectual property asset. An invalidity search may be commissioned to determine if the issued claims of the intellectual property asset are valid, etc. Prior electronic intellectual property document search tools do not support the different classes of searches. Rather, the burden is on the person doing the search, also known as the searcher, to limit the sections of the intellectual property document to be reviewed in the search based upon the scope of the search. As the quantity of granted intellectual property rights and published pending intellectual property applications in the database grow, the burden on the searcher increased as more associated documents need to be reviewed for each search.

Accordingly, there is a need for a tool to be used by a searcher to organize the results of a query submission to mitigate the burdens associated with evaluating the results and to take advantage of the electronic format of the intellectual property documents. The tool should enable the searcher to leverage the different sections of the intellectual property document during the search to more efficiently and effectively determine accurate, relevant, and desirable search results.

SUMMARY OF THE INVENTION

This invention comprises a method, system, and article for efficiently and effectively searching a collection of patent documents.

In one aspect of the invention, a computer implemented method is provided for assigning relevancy to results of a search on an electronic document collection. A collection of patent documents is compiled and indexed, with each of the patent documents in the collection being comprised of multiple sections. Each section of each patent in the collection is identified. A search profile is organized for the document collection. The search profile includes a selection of each identified section of each document in the collection. For each profile, a weight is assigned to each of the selected sections. At the time of submission of a query to the collection, a search profile is selected and query data is compared with data in each of the sections of the document collection as identified and assigned a weight in the selected profile. A relevancy score is computer for each document returned in a compilation of documents generated from the query submission. The documents in the compilation are ranked based upon the computed relevancy score. Thereafter, the results of the compilation are dynamically limited based upon the ranking A first compilation of the sorted relevant documents is generated based upon the dynamic limit as applied.

In another aspect of the invention, a computer system is provided with a processor in communication with storage media, and an electronic document collection maintained on the storage media. The electronic document collection is a compilation of intellectual property documents. Based upon characteristics of intellectual property documents, each of the documents in the collection has multiple sections. A director is employed to index and compile the collection of documents. The director is in communication with a document manager, which identifies each section of the documents in the collection. In addition, a profile manager is provided to organize a search profile for the document collection. The profile manager is in communication with the document manager and employs the search profile to include a selection of each of the identified section of each document in the compiled collection. In addition to selecting specific sections for including in the profile, the profile manager assigns a weight to each of the selected sections in each profile. The weight is a reflection of the emphasis on the associated section. At query time, a query manager submits a query to the document collection. The query includes a selection of at least one search profile and compares query data with data in each of the sections of the document as reflected in the profile. Following the submission by the query manager, a compilation of relevant patent documents is generated and returned. Each document in the returned compilation includes a match of the query to data in at least one identified profile section having an assigned weight and a relevancy score. A relevancy navigator is provided in communication with the query manager to rank the documents in the compilation and to dynamically limit the results of the compilation based upon the rank. A first compilation of sorted relevant documents is produced based upon the dynamic limit as applied.

In yet another aspect of the invention, an article is provided with a computer-readable carrier including computer program instructions configured to assign relevancy to results of a search on an electronic document collection on computer memory. The computer-readable carrier includes computer program instructions to perform a relevancy assignment. Instructions are provided to compile and index a collection of intellectual property documents. Each of the patent documents in the collection is divided into multiple sections. Following indexing of the collection, instructions are provided to identify each of the sections of each document in the collection. Once the sections of the documents are identified, instructions are provided to organize a search profile for the document collection. The search profile is a selection of each identified sections of each document in the collection. Additionally, instructions are provided to assign a weight to each of the sections identified in the search profile. Upon submission of a query to the document collection, instructions are provided to select at least one search profile and to compare query data with data in the sections of the documents in the collection as identified in the profile. Instructions are then provided to compute a relevancy score for each document returned in a compilation of documents generated from the query submission and to rank the documents in the collection based upon the score. Once the ranking is completed, instructions are provided to dynamically limit the results in the compilation based upon the rank. A first compilation of sorted relevant documents is generated and returned based upon the dynamic limit applied to the compilation.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

Figure 1:
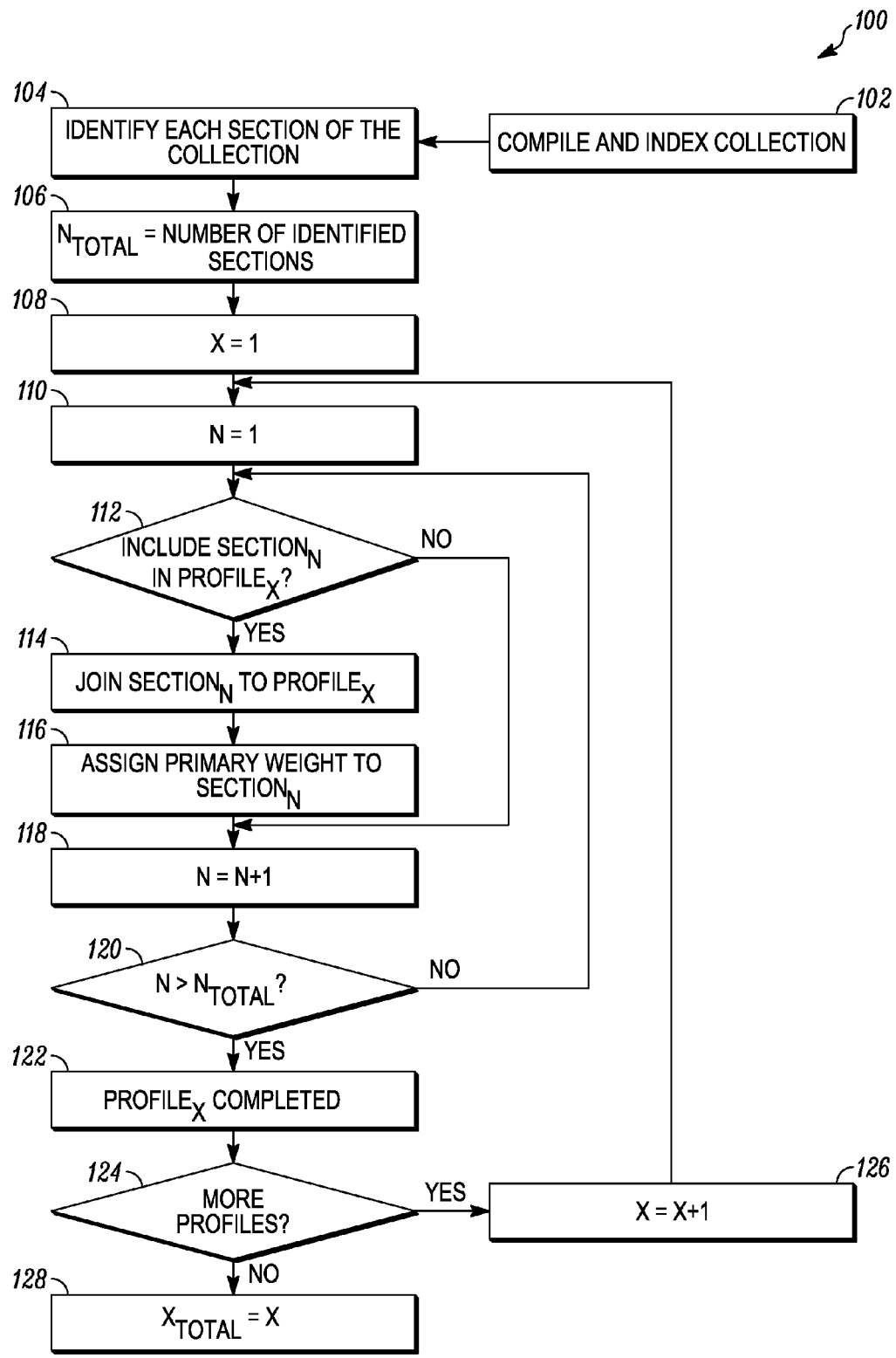
FIG. 1 is a flow chart illustrating a process for identifying sections of a patent document for creation of one or more profiles.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers and directors. A manager and/or director may be implemented in programmable hardware devices such as field programmable gate arrays, programmable array logic, programmable logic devices, or the like. The manager and/or director may also be implemented in software for execution by various types of processors. An identified manager and/or director of executable code may, for instance, comprise one or more physical or logical blocks of computer instructions which may, for instance, be organized as an object, procedure, function, or other construct. Nevertheless, the executables of an identified manager and/or director need not be physically located together, but may comprise disparate instructions stored in different locations which, when joined logically together, comprise the manager and/or director and achieve the stated purpose of the manager and/or director.

Indeed, a manager and/or director of executable code could be a single instruction, or many instructions, and may even be distributed over several different code segments, among different applications, and across several memory devices. Similarly, operational data may be identified and illustrated herein within the manager and/or director, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

An intellectual property document collection is a compilation of issued and published applications. A patent document collection is a subset of the intellectual property document collection. Patent documents come in the form of issued patent grants and published patent applications. The difference between the two categories of documents identifies their enforceable value. More specifically, a patent grant is an actual property right that can be enforced in a court of law, whereas a published patent application is a pending application that is a pending patent right. Each patent document is parsed into multiple sections, with each section containing written words and phrases, also known as string data. To accommodate searching of the collection, each document in the collection is parsed based upon sections within each document, and a weight is assigned to each of the parsed sections of the intellectual property documents. The weight is a numerical measure of emphasis to be placed on one or more specific sections of the document for the query. A selection of document sections together with weights assigned to the selected sections creates a search profile. Depending upon the scope of the search, the search may be limited to specific sections of the documents, or different emphasis may be placed on matching query data in each section of the document. To accommodate presentation of query results from a query submission, the relevancy of the results may be dynamically limited. More specifically, the relevancy associated with the results may be dynamically modified based upon statistical analysis of the results, based upon the entirety of the query results, and/or based upon the characteristics of the search profile. Accordingly, the creation and selection of a search profile is directly related to the quantification and presentation of the search results.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

It is recognized that documents describing issued and published intellectual property documents are divided into multiple sections. Each section is required for a submission of a completed application, and each section has a purpose. The details of each section of the underlying intellectual property are not going to be discussed herein. However, for purposes of disclosure, the different sections of a patent, as an example of an intellectual property document, will be identified. For the most part, each patent application includes a title, a priority filing date, an abstract, a background description, a summary, a brief description of the drawing figures (if any), drawing figures (if any), a detailed description of the invention, and claims.

There are different search categories that are employed in the patent arena depending upon the purpose of the search. For example, an infringement and/or product clearance search is concerned with the language in the claims, and therefore should be essentially directed to the claims present in the document collection. A validity and/or invalidity search is concerned with any known prior art, and requires identification of the priority filing date of the patent document. When an inventor(s) seeks to determine the novelty of their invention prior to or following submission of a patent application, the inventors or his/her agent or representative may commission a novelty search. Such a search may de-emphasize the claims and focus on the detailed description of the invention. Accordingly, as shown herein, each search places emphasis on different sections of a patent document in the document collection.

FIG. 1 is a flow chart (100) illustrating a process for identifying sections of a patent document for creation of one or more profiles. With reference to the U.S. Patent and Trademark Office as an example, under current rules of practice, each patent document submitted to the U.S. Patent and Trademark Office will contain the following sections: title, background—including the technical field and a description of the prior art, summary of the invention, brief description of the drawing figures, drawing figures, detailed description of the preferred embodiment(s), claims, and abstract. In one embodiment, not all patent documents will contain drawing figures, such as in chemical practice and some foreign patents and patent documents. Similarly, in other countries and regional offices and in prior domestic practice, there may be a different quantity of sections in a patent document, or the sections may be presented in a different order. Accordingly, prior to placing an emphasis on one or more sections of a patent document in the collection with a query, the origin of the documents, the different sections of the documents, and the order in which the sections are organized in the collection need to be identified.

Initially, a collection of patent documents is compiled and indexed (102). It is recognized in the art that patents and patent publications are comprised of multiple sections. Following the compilation of the documents, each section in each patent in the collection of documents is identified (104). The variable $N_{Total}$ is assigned to the number of sections in the patent document (106). Different profiles are created to address different searching needs. A profile is created by placing an emphasis on different combinations of sections of the patent documents, and/or by omitting one or more sections of the document from consideration during the search itself by assigning a value of zero to that section. To support profile based searching, at least one profile is created. However, in one embodiment, there are multiple profiles created to support selection of a profile to meet the needs of a particular search. Once the sections of the patent documents are identified at step (106), a counting variable X associated with the profile designation is initialized and assigned to the integer one (108) and the counting variable N pertaining to the sections of the patent document is assigned to the integer one (110). Starting with section$_N$ of the patent document collection, it is determined if section$_N$ will be employed as part of the profile being created, profile$_X$ (112). A positive response to the determination at step (112) joins section$_N$ to profile$_X$ (114). With the selection of section$_N$, a primary weight is assigned to section$_N$ (116). The primary weight is a numerical value that signifies the importance of section$_N$ to profile$_X$ with respect to other sections of the patent document collection, including any previously selected sections and other sections to be joined or omitted from the profile. Following step (116) or a negative response to the determination at step (112), the variable N associated with the sections of the patent documents is incremented (118). It is then determined if all of the identified sections of the patent documents in the compiled and indexed collection have been evaluated for joining or omitting from profile$_X$ (120). A positive response to the determination at step (120) concludes the profile creation process for profile$_X$ (122). Conversely, a negative response to the determination at step (120) is followed by a return to step (112) for consideration of additional sections in the collection for profile$_X$. It is then determined if there are any additional profiles to create for the document collection (124). A positive response to the determination at step (124) is followed by an increment of the counting variable X (126) and a return to step (110). Conversely, a negative response to the determination at step (124) concludes the creation of the profiles with assignment of the number associated with X to the variable $X_{Total}$ (128). Accordingly, one or more profiles may be created for a patent document collection, with each profile placing an emphasis on one or more identified sections in the patent document collection.

Figure 2:
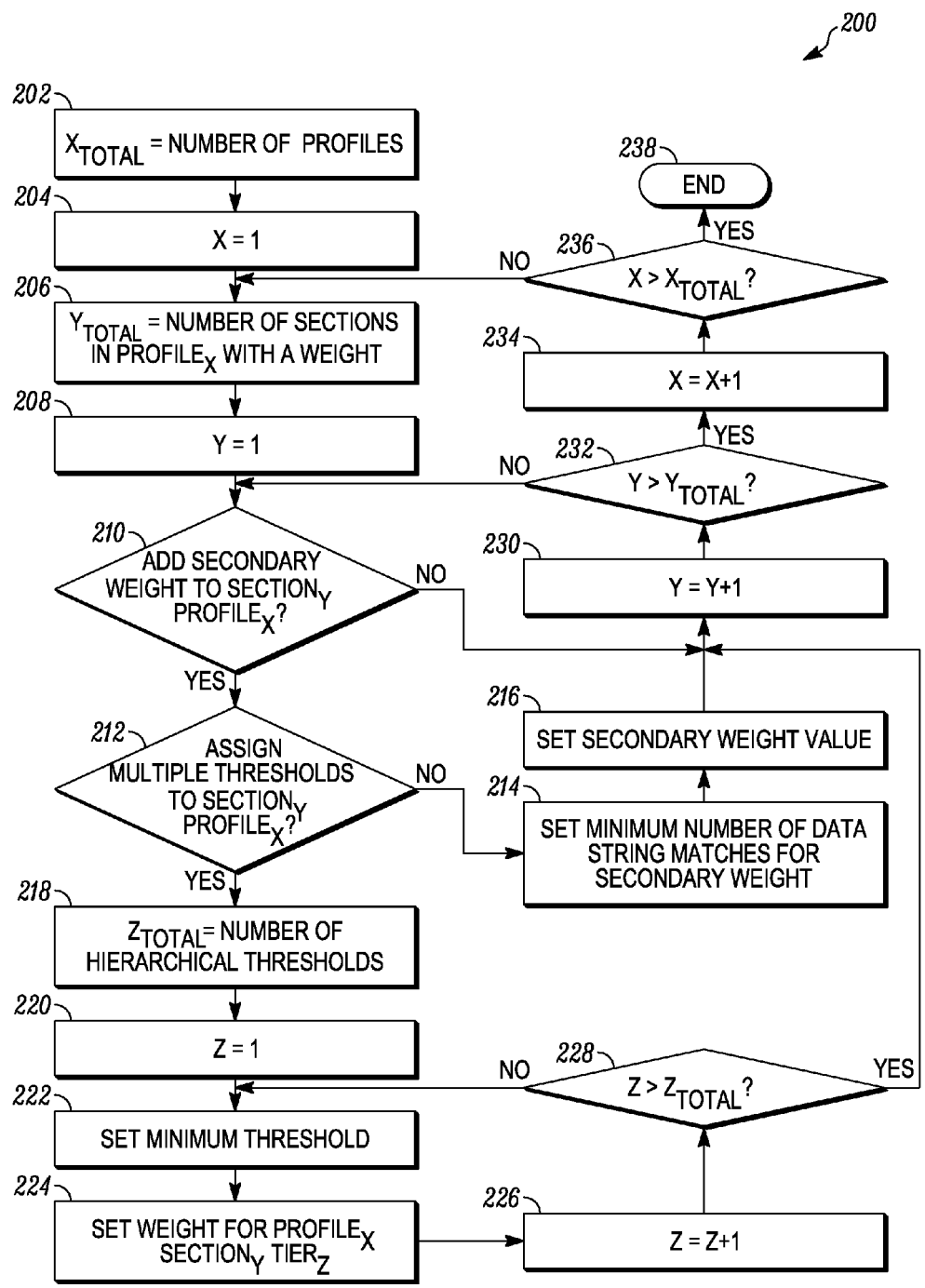
FIG. 2 is a flow chart illustrating a process for creating a secondary weight for one or more profiles.

As demonstrated in FIG. 1, one or more profiles may be created to emphasize or de-emphasize employment of select sections of the patent documents during the search process. FIG. 2 is a flow chart (200) demonstrating an added dimension of emphasis that may be added to each created profile. More specifically, an added weight in the form of a secondary weight may be employed to either add or subtract from the weight score based upon a quantity of matching strings in select sections of each profile. The variable $X_{Total}$ is assigned to represent the quantity of profiles created (202), as demonstrated in FIG. 1, and a counting variable X is assigned to the integer one (204). Thereafter, the variable $Y_{Total}$ is assigned to represent the quantity of sections in profile$_X$ with a weight assignment (206), as demonstrated in FIG. 1. To assess the individual sections of a profile, a counting variable Y is assigned to the integer one (208). It is then determined if a secondary weight will be added to section$_Y$ of profile$_X$ (210). A negative response to the determination at step (210) is followed by a jump to step (230) to evaluate the next section in the profile, if any. Conversely, a positive response to the determination at step (210) is followed by a second query to determine if the secondary weight assignment will be a tiered structure (212). More specifically, each profile may include a hierarchy of weight values depending upon a quantity of data string matches returned during the search process with the selected profile. A negative response to the determination at step (212) is followed by setting the minimum threshold of data string matches that must be returned in order to employ a secondary weight assignment to section$_Y$ (214). Following step (214), the secondary weight value is set for profile$_X$, section$_Y$ (216). The input at steps (214) and (216) is to set the parameters satisfying the secondary weight structure as established at step (212). Accordingly, for each profile section, a secondary weight value may be set to provide emphasis on the search results when a threshold value of matches has been exceeded.

In addition to setting a single secondary weight value, each select section of a profile may be configured to accommodate a hierarchy of secondary weight threshold values. Following a positive response to the determination at step (212), the variable $Z_{Total}$ is assigned to the quantity of hierarchical thresholds to be assigned to profile$_X$, section$_Y$ (218), and a tier counting variable Z is set to the integer one (220). Following step (220), the minimum threshold of data string matches that must be returned in order to employ a secondary weight assignment to profile$_X$, section$_Y$, tier$_Z$ is set (222), and the secondary weight value is set for profile$_X$ section$_Y$ tier$_Z$ (224). Once the weight value is set for the select Tier$_Z$, the tier counting variable Z is incremented (226), followed by a determination as to whether all the weight values have been set for all of the tiers for profile$_X$, section$_Y$ (228). A negative response to the determination at step (228) is followed by a return to step (222). Conversely, a positive response to the determination at step (228) or following step (216) is followed by an increment of the counting variable Y to proceed to evaluation of the next section of the select profile (230). It is then determined if all of the sections of the select profile have been evaluated for assignment of a hierarchy of secondary weight threshold values (232). A negative response to the determination at step (232) is followed by a return to step (210), and a positive response to the determination at step (232) is followed by an increment of the profile counting variable X (234). Following step (234), it is determined if all of the created profiles have been evaluated for assignment of a secondary weight (236). A negative response to the determination at step (236) is followed by a return to step (206), and a positive response to the determination at step (236) concludes the assignment of a hierarchy of secondary weight threshold values to select sections of created profiles (238). Accordingly, each profile may be configured with a hierarchy of secondary weights to place emphasis on both the select sections of each profile as well as the quantity of matching strings within a profile.

As shown in FIG. 2, a hierarchy of secondary weights, i.e. tiers, may be applied to each individual section of a profile, with the secondary weights based upon one or more threshold values for the quantity of matches between the query string and the data in the document collection being parsed. In another embodiment, the secondary weight may reflect the location within one or more profile sections in which the string match occurs, as demonstrated in FIG. 3. This secondary weight may be separate from or supplemental to the secondary weight demonstrated in FIG. 2. The variable $X_{Total}$ is assigned to represent the quantity of profiles created (302), as demonstrated in FIG. 1, and a counting variable X is assigned to the integer one (304). Thereafter, the variable $Y_{Total}$ is assigned to represent the quantity of sections in profile$_X$ with a weight assignment (306), and a counting variable Y is assigned to the integer one (308). It is then determined if a secondary weight will be added to profile$_X$, section$_Y$ (310). A positive response to the determination at step (310) is followed by dividing profile$_X$, section$_Y$ into multiple subsections (312). There are different embodiments that may be employed for the division at step (312). For example, in one embodiment, there may be three subsections with a first subsection being limited to the first sentence, a third subsection being limited to the last sentence, and a second subsection being limited to all data located between the first and third subsections. Similarly, in another embodiment, profile$_X$, section$_Y$ may be divided into multiple sections, with each section length pertaining to a percentage of the profile$_X$, section$_Y$ as a whole. Regardless of the method employed for determining the quantity of subsections, each profile$_X$, section$_Y$ may be divided into two or more subsections with a secondary weight assigned to reflect a matching string not only in profile$_X$, section$_Y$ but also the location of the match in the select subsection.

Following step (312), the variable $Z_{Total}$ is assigned to the quantity of subsections created for profile$_X$, section$_Y$ (314), and a counting variable Z assigned to the integer one (316). A secondary weight is assigned to profile$_X$, section$_Y$, subsection$_Z$ (318). Following the assignment at step (318), the counting variable Z is incremented (320), followed by a determination as to whether there are any more subsections in profile$_X$, section$_Y$ that have not been evaluated for a secondary weight assignment (322). A negative response to the determination at step (322) is followed by a return to step (318). Conversely, a positive response to the determination at step (322) or a negative response to the determination at step (310) is followed by an increment of the counting variable Y (324). It is then determined if there are any sections in profile$_X$ that have not been evaluated for assignment of a secondary weight (326). A negative response to the determination at step (326) is following by a return to step (310). Conversely, a positive response to the determination at step (326) is followed by an increment of the counting variable X (328), and a determination as to whether all of the profiles have been evaluated for a secondary weight assignment (330). A negative response to the determination at step (330) is followed by a return to step (306), and a positive response concludes the secondary weight assignment process. Accordingly, a profile section may be subdivided into multiple subsections based upon their physical location, with a secondary weight assigned to one or more of the identified subsections.

Figure 3:
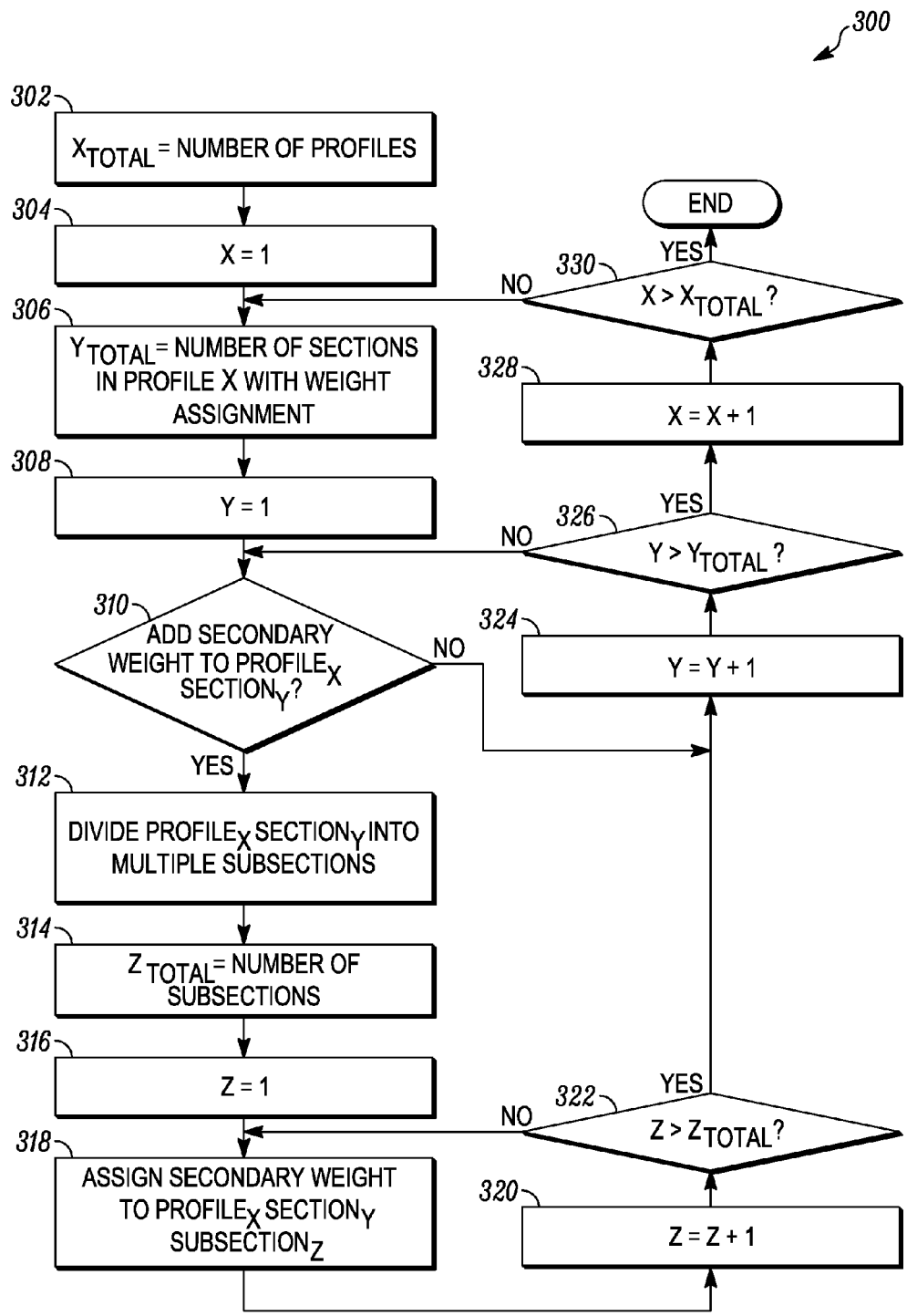
FIG. 3 is a flow chart illustrating a process for employing the secondary weight to reflect the location within each profile sections in which the string match occurs.

In FIGS. 1-3, a primary profile was created for searching patent documents for matching string sets, and applying a weight to different sections of each document that has a match. A secondary profile may also be employed based upon a compilation of documents with matching string sets. More specifically, before presenting the results to the searcher, a secondary profile may be employed to apply a secondary weight to the results based upon a secondary consideration. Different characteristics of a patent document may be employed for use of a secondary weight, including, but not limited to the priority date and/or the publication date. In the patent field, a priority date represents the earliest date in a patent family. More specifically, a priority date is established for an invention when one first files a patent application that describes the invention in details. The publication date for a patent document represents the date an issued patent is granted, and the publication date for a patent publication represents the data a pending patent application is published. Secondary profiles may be created employing data from one or all of these noted dates.

Figure 4:
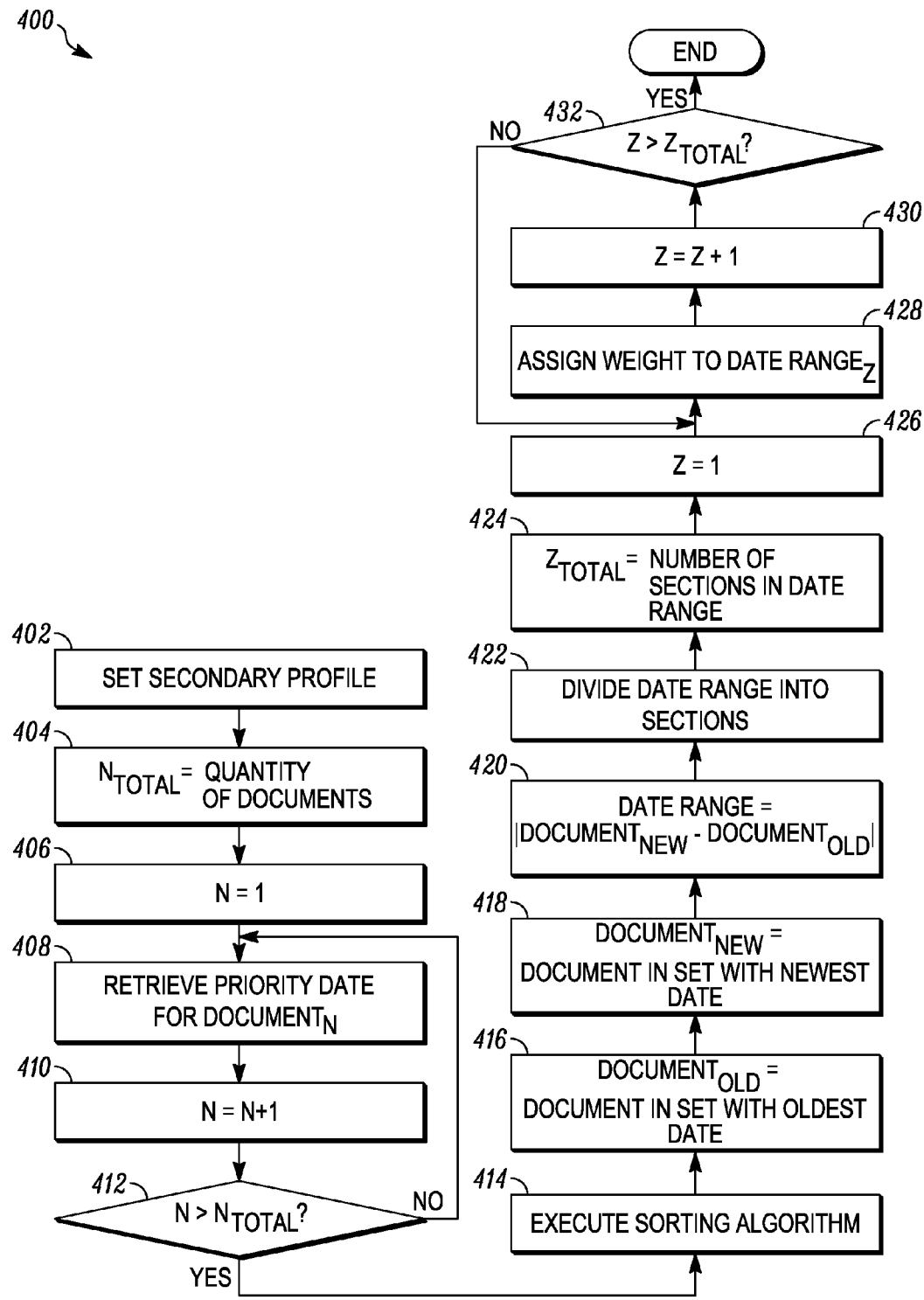
FIG. 4 is a flow chart illustrating a process for creating a secondary profile and assigning weights to search results from a query submission.

FIG. 4 is a flow chart (400) illustrating a process for creating a secondary profile that assigns weights to search results based upon a date factor associated with document data returned from a query submission. In one embodiment, the date factor may include, but is not limited to, the publication date, the filing date, and the foreign priority date. Initially, the secondary profile, SecondaryProfile, is set (402). The quantity of documents from the query submission is assigned to the variable N$_{Total}$ (404), and a counting variable N is set to the integer one (406). For document$_N$ in the set of returned documents the priority date is retrieved (408), followed by an increment of the variable N (410). It is then determined if the retrieval of the factor of SecondaryProfile has been completed for the set of returned documents (412). A negative response to the determination at step (412) is followed by a return to step (408). Conversely, a positive response to the determination at step (412) is followed by execution of a sorting algorithm to sort the documents in the search results based upon the extracted SecondaryProfile factor (414). There are many different forms of sorting algorithms that may be employed, and as such, the invention shall not be limited to any particular sorting algorithm. Once the sorting of the documents in the collection is completed, the variable Document$_{OLD}$ is assigned to a document in the set with the oldest SecondaryProfile date (416), and the variable Document$_{NEW}$ is assigned to one document in the set with the newest SecondaryProfile date (418). The variable DateRange is assigned to the difference between the variables Document$_{NEW}$ and Document$_{OLD}$ (420), and the DateRange is divided into multiple sections (422). There are different embodiments that may be employed for the dividing the DateRange at step (422). For example, in one embodiment, there may be three subsections with a first subsection being limited to the documents closest to the date associated with Document$_{NEW}$, a third subsection being limited to the documents closest to the date associated with Document$_{OLD}$, and a second subsection being limited to all documents with dates located between the first and third subsections. Similarly, in another embodiment, the DateRange may be divided into multiple sections, with each section having an equal distribution of documents from the collection. Accordingly, regardless of the method employed, each subsection in the document set may be applied a secondary weight with relevancy of the query results based upon the secondary weight.

Following sorting of the documents from the query results based upon at least one secondary data criteria, the variable Z$_{Total}$ is assigned to the quantity of sections in the DateRange (424), and the counting variable Z is assigned to the integer one (426). A weight is assigned to DateRange$_Z$ (428), followed by an increment of the variable Z (430). Following step (430), it is determined if the weight for each subsection has been assigned (432). A negative response to the determination at step (432) is followed by a return to step (428). Conversely, a positive response to the determination at step (432) concludes the weight assignment for each created subsection. Accordingly, a secondary profile may be created to apply a secondary weight to a result set to further emphasize a secondary factor prior to presenting the data.

Figure 5:
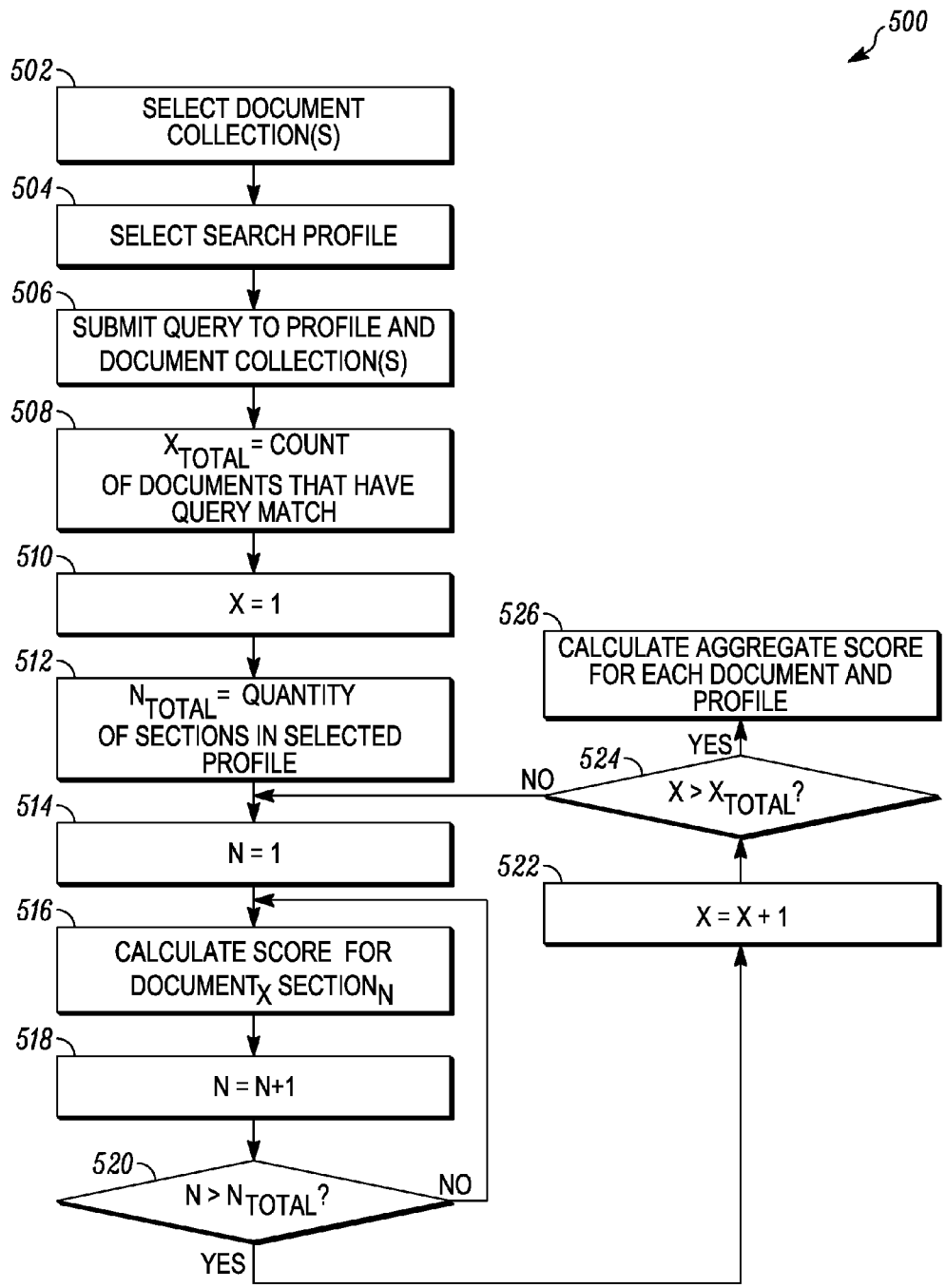
FIG. 5 is a flow chart illustrating a process for applying a secondary profile to a query result set.

Application of a secondary factor to query results of a document collection is not limited to dates. FIG. 5 is a flow chart (500) illustrating application of the secondary profile to a result set that does not employ a date associated with any one of the patent documents. When the search is initiated, one or more document collections are selected to support a query (502). In one embodiment, the document collections may be in the form of intellectual property document collections. Similarly, in one embodiment, the document collections may be in the form of different states, such as a collection of documents issued by the U.S. Patent and Trademark Office, the Japanese Patent Office, the European Patent Office, etc. Once the document collection is selected, a profile for the search is selected (504). Examples of profiles are demonstrated above in FIGS. 1-3. Upon completion of the selections at steps (502) and (504), a query is entered and submitted to the profile and selected document collection(s) (506). In one embodiment, the query is a string. A count of the quantity of documents in the collection that have at least one occurrence of the query is determined and assigned to the variable X$_{Total}$ (508), and a counting variable for the matching documents, X, is assigned to the integer one (510). In addition, the variable N$_{Total}$ is assigned to the quantity of sections in the selected profile for the query submission (512), and a counting variable for the selected profiles, N, is assigned to the integer one (514). A score is calculated for each Document$_X$ Section$_N$. In one embodiment, a score is calculated as the product of the number of matches of the query in Section$_N$ with the quantity of points assigned to Section$_N$ (516). In one embodiment, the point allocation to Section$_N$ indicates the value of the specific section in the collection.

Following step (516), the variable N is incremented (518) followed by a determination to indicate whether all of the sections in the profile have been evaluated (520). A negative response to the determination at step (520) is followed by a return to step (516). Conversely, a positive response to the determination at step (520) is followed by an increment of the variable X (522). It is then determined if all of the documents in the count have been evaluated (524). A positive response to the determination at step (524) concludes the score assessment for the returned documents (526). Conversely, a negative response to the determination at step (524) is followed by a return to step (516) for evaluation of the score of the next document over the profile sections.

Once all of the documents and selected profiles have been assigned a score, an aggregate score is calculated for each of the documents and selected profiles returned from the query submission (526). As shown above in FIG. 5, each document in the compilation includes a score, in the form of a mathematical value based upon the quantity of matching strings and the associated weights as designated in the profile.

It is understood that in the process of conducting a patent search it is important to determine which search results are more relevant. As such, in addition to the score being a contributing factor to a query match, it is also employed to provide a ranking of matching documents. The ranking indicates which returned documents are considered to be more relevant than other returned documents. There are different factors that are employed with the ranking, and may include a rank based upon the score, and/or a combination of the rank with a secondary factor.

Figure 6:
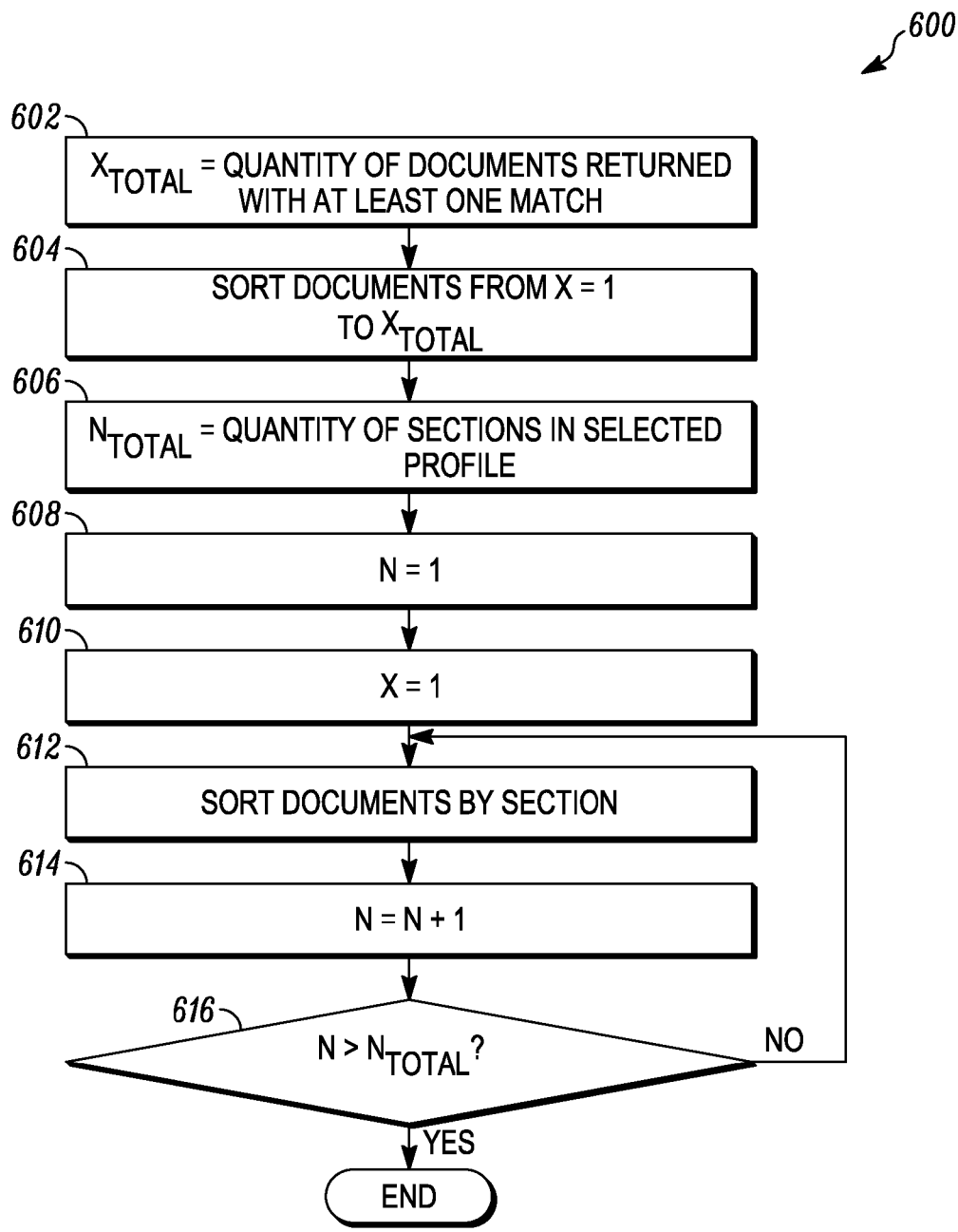
FIG. 6 is a flow chart illustrating a process for sorting query results.

FIG. 6 is a flow chart (600) illustrating a process for sorting the document returned from the query based upon the score assignment per returned document and per section in the profile. As calculated in FIG. 5, the variable $X_{Total}$ is assigned to the total quantity of documents returned in the query that has at least one occurrence of the query submission (602). A sorting algorithm is then invoked to sort the documents (604). In one embodiment, the documents may be sorted in order from the highest score to the lowest score, or from the lowest score to the highest score. There are many different forms of sorting algorithms that may be employed, and as such, the invention shall not be limited to any particular sorting algorithm. Once the sorting of the documents in the collection as a whole is completed, each of the document collections in the query selected profile(s) may be sorted as well to create a sort of documents within each section. In one embodiment, the process of sorting returned documents may be considered a ranking of the score results. The variable $N_{Total}$ represents the quantity of sections in the profile selected for the search (606). The section counting variable N is initialized at the integer one (608) and the document counting variable X is initialized at the variable one (610). For section N, each of the documents X with at least one occurrence of the query input are sorted from the first document X to the last document $X_{Total}$ (612). Once the sorting is completed for section N, the variable N is incremented (614), followed by a determination as to whether all of the sections in the selected profile have been evaluated for sorting (616). A negative response to the determination at step (616) is following by a return to step (612). Conversely, a positive response to the determination at step (616) indicates that all of the sections in the selected profile have had the population of documents sorted. Accordingly, sorting of the query results are performed on two levels, the first level being the query in it's entirety, and the second level being a sorting by selected sections that comprise the profile.

Figure 7:
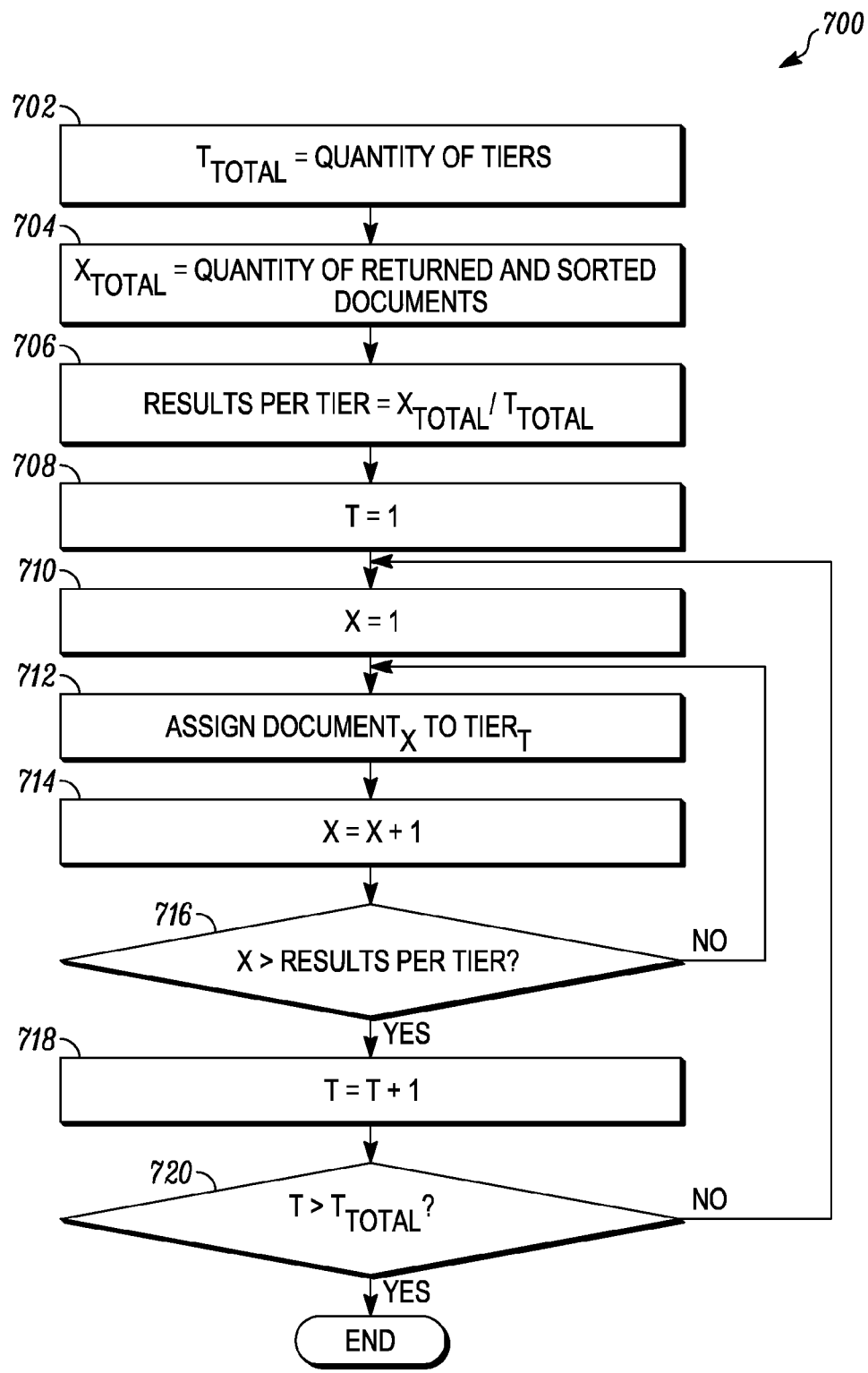
FIG. 7 is a flow chart illustrating a process for assigning relevancy to the returned and sorted results according to the preferred embodiment of this invention, and is suggested for printing on the first page of the issued patent.

Once the sorting(s) of the document collection is completed, there are different tools that may be invoked to convey the sorted query results. More specifically, upon completion of a query and sorting of the query results, the data conveyed to the query submitter is based upon relevancy of the results from the query as a whole, and/or relevancy per section in the submitted query profile. FIG. 7 is a flow chart (700) illustrating a process for assigning relevancy to the returned and sorted search results. The quantity of tiers that the returned search results is assigned to the variable $T_{Total}$ (702). In one embodiment, the variable $T_{Total}$ is a static variable. However, in another embodiment, the variable $T_{Total}$ may be a dynamic variable. The relevancy assessment may be conducted on two levels, the first level being based on all of the documents in the query results, and the second assessment based on each profile document collection. The variable $X_{Total}$ represents all of the documents returned and sorted from the query (704), and it is divided by the quantity of tiers, $T_{Total}$ to calculate the quantity of query results, QS, to be assigned to each tier, T (706). For assignment of query results to a tier T, the tier counting variable T is initialized at the integer one (708) and a counting variable X representing the documents to be assigned to a tier is initialized at the integer one (710). Following the initializations at steps (708) and (710), Document$_X$ is assigned to Tier$_T$ (712). Following the assignment at step (712), the variable X is incremented (714) and a determination as made as to whether Tier$_T$ is full with assigned query results (716). A negative response to the determination at step (716) is followed by a return to step (712). Conversely, a positive response to the determination at step (716) is followed by completion of the assignment of query results for Tier$_T$. The variable T is then incremented (718), followed by a determination as to whether all of the assignments of query results to tiers are completed (720). A negative response to the determination at step (720) is followed by a return to step (710). Conversely, a positive response to the determination at step (720) completed the assignment to query results to the established tiers. It should be noted that the assignment of the sort list of query results to tiers may be in a top down format from the most relevant of the sorting to the least relevant, or in a bottom up format from the least relevant to the most relevant. Similarly, in one embodiment, inflection points are present in the sorted and ranking results and adjacent tiers are divided at the inflection points. Accordingly, the query results are assigned to a tier to emphasize the relevancy of select sorted documents.

As demonstrated above, query results may be sorted on a coarse basis, regardless of the profile(s) in the query submission. However, the tier assignment may also be conducted on a profile basis, also known as a granular basis. More specifically, each profile in the query submission may be sorted in order of relevancy of the returned documents in view of the characteristics of the profile. To support the employment of the profile, each set of documents assigned to a profile may also be organized into tiers in the manner demonstrated in FIG. 7. This granular profile tier assignment enables query results to be further conveyed based upon the characteristics of the profile.

As demonstrated above, each patent in the query results of a document collection may be parsed to provide presentation of results based upon relevance. In one embodiment, the results may be presented to emphasize or de-emphasize the value of data matches in specified sections of a returned compilation of intellectual property documents. Similarly, in one embodiment, a limit may be placed on presentation of the search results based upon relevancy. With respect to the assignment of tiers to the query results, only select tiers may be available for viewing, wherein the select tiers may be those teirs deemed to contain more relevant query results. Similarly, with respect to scoring of query results, a limit may be assigned such that only those results within a defined score may be presented to the query submitted. The limitations of presentation of query results should not be limited to the examples described herein, as other forms of limiting viewing of query results to only those results with certain relevancy scores may be embodied.

Figure 8:
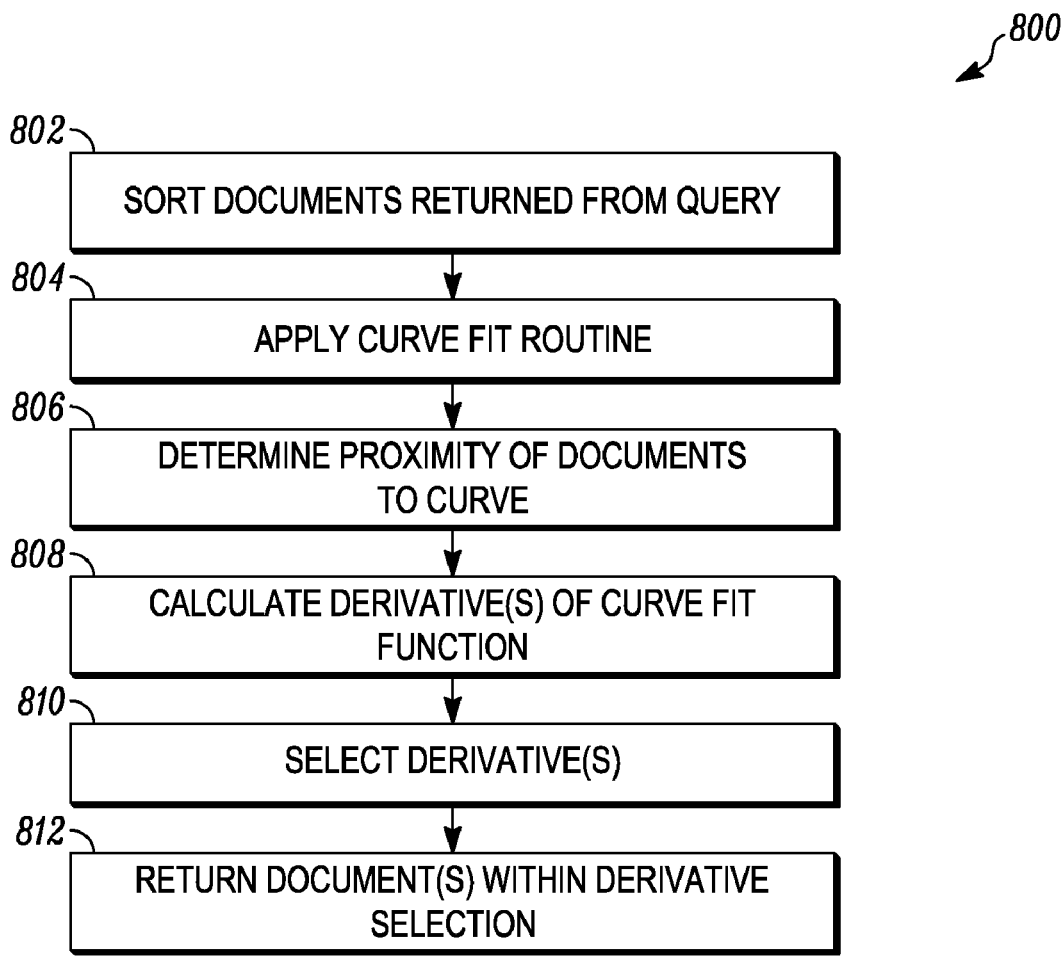
FIG. 8 is a flow chart illustrating a process for dynamically limiting presentation of query results of the underlying document collection.

In one embodiment, the sorted query results are statically presented as a compilation of relevant documents. However, in another embodiment, the return of the document collection may be dynamically limited based upon ranking of the returned documents. The dynamic aspect supports changing relevancy criteria to reflect query results. FIG. 8 is a flow chart (800) illustrating one embodiment for dynamically limiting the presentation of query results. As described above, each of the documents returned from the query is sorted based upon a numerical factor of relevancy to the query submission factors (802). A curve fitting routine is applied to the compilation of returned documents based upon the numerical data (804), i.e. numerical factor of relevancy assigned to each of the returned documents. The curve fitting routine calculates a theoretical function to data of the compilation. More specifically, the curve fitting routine determines this theoretical function based upon the raw numerical factor of relevancy. Based upon the curve fitting routine, some of the documents in the compilation may lie on or near the curve of the theoretical function (806). One or more derivatives of the theoretical function are calculated (808). To dynamically limit the results in the compilation, a quantity of derivatives for the function are selected (810). More specifically, to limit the results of the compilation to the most relevant documents, the dynamic selection would be limited to within a first derivative of the function of the curve fitting routine. Similarly, to expand the results of the compilation, which yields a larger quantity of documents, the dynamic selection would be expanded to the second derivative (or larger). Based upon the quantity of derivatives selected, a compilation of documents that lie within the derivative selection is returned (812). Accordingly, the compilation of documents returned is dynamically modified based upon the proximity of the document to the theoretical function of the curve fitting routine.

Figure 9:
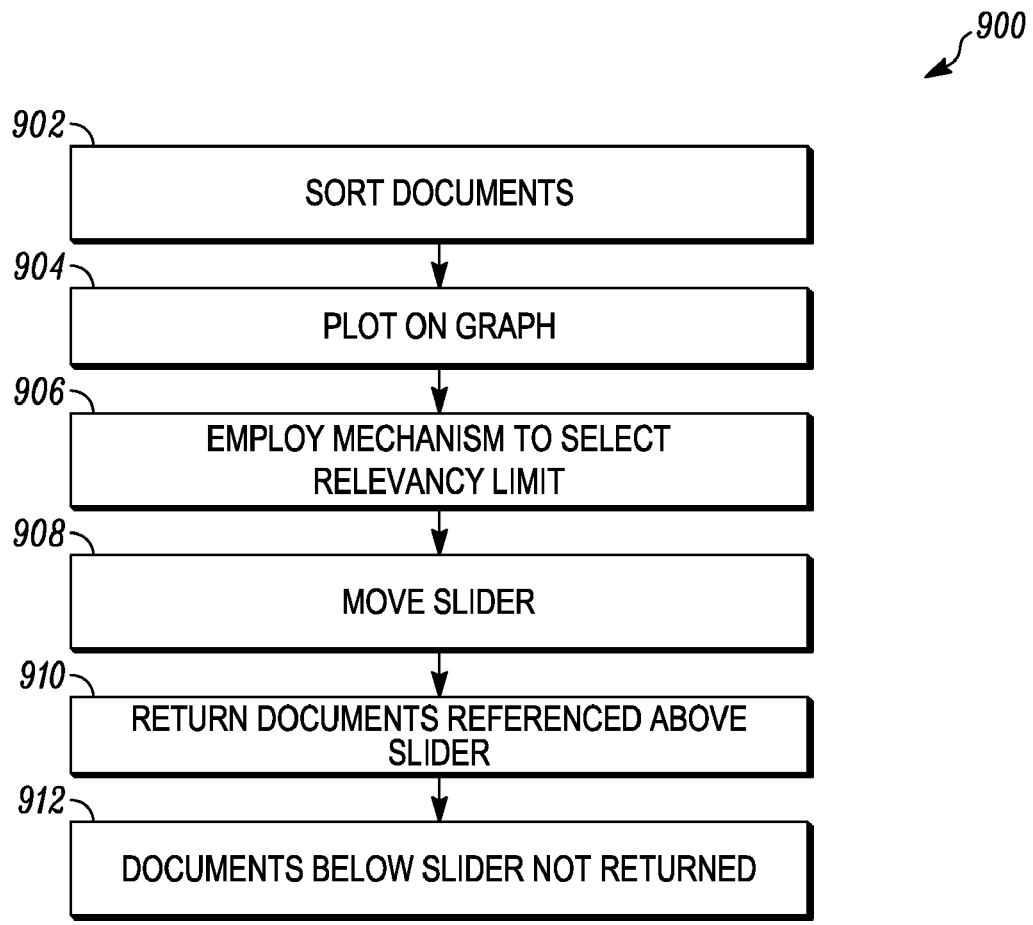
FIG. 9 is a flow chart illustrating a process for employing a graphical user interface as a tool to dynamically set a limit to query results of the underlying document collection.

The dynamic selection process and tool shown in FIG. 8 illustrates one embodiment to limit the compilation results. In another embodiment, a graphical user interface is applied as a veneer over source code to support user interaction and modification with the general results of the sorted compilation. FIG. 9 is a flow chart (900) illustrating a process for dynamically limiting the results in the compilation through use of the graphical user interface. As described above, each of the documents returned from the query is sorted based upon a numerical factor of relevancy to the query submission factors (902). The search results are plotted on a graph (904). There are different forms of graphs that may be employed. In one embodiment, the graph may be in the form of a two dimensional graph with the quantity of documents returned on one axis, and the numerical relevancy factor on a second axis. A mechanism is provided on the interface that enables the quantity of documents to be limited to a selected relevancy value (906). In one embodiment, a slider is provided on the user interface, and through a pointing tool, the slider may be moved to any relevancy value provided on the graph (908). Based upon the movement of the slider, the quantity of relevant documents, and the specific documents considered relevant, dynamically changes. More specifically, the slider functions as a line of demarcation wherein all documents associated with the relevancy assignment above the slider position are returned as relevant (910), and all documents associated with the relevancy assignment below the slider position are not returned (912). In one embodiment, all documents that are at the relevancy assigned to the slider position are returned as relevant. Conversely, in one embodiment, all documents that are at the relevancy assigned to the slider position are not returned as they are not considered relevant. Accordingly, the slider on the graphical user interface may be moved to adjust the documents that are considered relevant and returned in the compilation.

Figure 10:
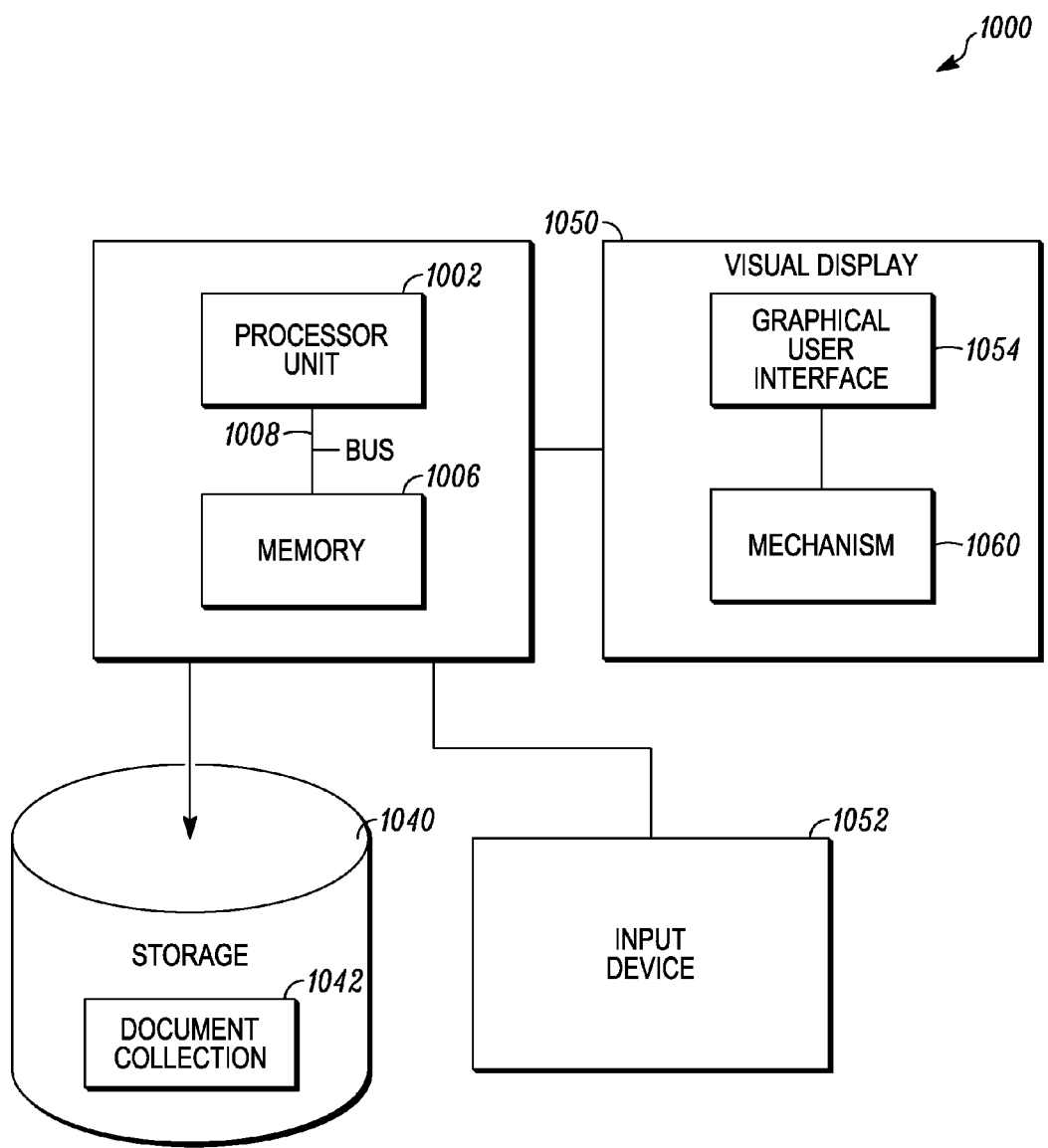
FIG. 10 is a block diagram illustrating an example of a graphical user interface.

As described above in FIG. 9, a graphical user interface may be employed to provide a tool to facilitate the dynamic selection of relevant documents. FIG. 10 is a block diagram (1000) illustrating an example of a graphical user interface. More specifically, a computer system (1000) is provided with a processor unit (1002) coupled to memory (1006) by a bus structure (1008). Although only one processor unit (1004) is shown, in one embodiment, more processor units may be provided in an expanded design. The system (1002) is shown in communication with storage media (1040) configured to house a document collection (1042). In one embodiment, the electronic document collection includes a compilation of patent documents, including issued patents and published patent applications. The storage media (1040) is in communication with the processor unit (1004). In addition, the system is shown in communication with a visual display (1050) for presentation of visual data. An input device (1052) is employed to communicate with the visual display (1050). There are many different forms of input devices that may be employed, including, but not limited to, keyboard, mouse, track ball, electronic pen, etc. A graphical user interface (1054) is provided on the visual display (1050) to convey a graphical presentation of a compilation of query results based upon both a computed relevancy score attached to the individual results, and a quantity of documents that comprise the compilation. In one embodiment, the graphical user interface (1054) functions as a veneer over source code executed on the processor (1004). A graphical mechanism (1060) accessible through the input device (1052) is provided within the graphical user interface to support dynamic selection of a subset of the query results. In one embodiment, the graphical mechanism (1060) is in the form of a slider that represents a line of demarcation within the graphical presentation of the query results. As the graphical mechanism (1060) is moved across the graphical presentation, the specific query results to be placed in the compilation are modified. In one embodiment, all documents referenced on one side and/or included all documents that fall on the graphical mechanism (1060) are selected for inclusion in the query results, and all documents referenced on a second side of the graphical mechanism (1060) are excluded. Accordingly, the graphical mechanism (1060) of the graphical user interface is a tool that applies dynamic modification to the compilation of query results.

Figure 11:
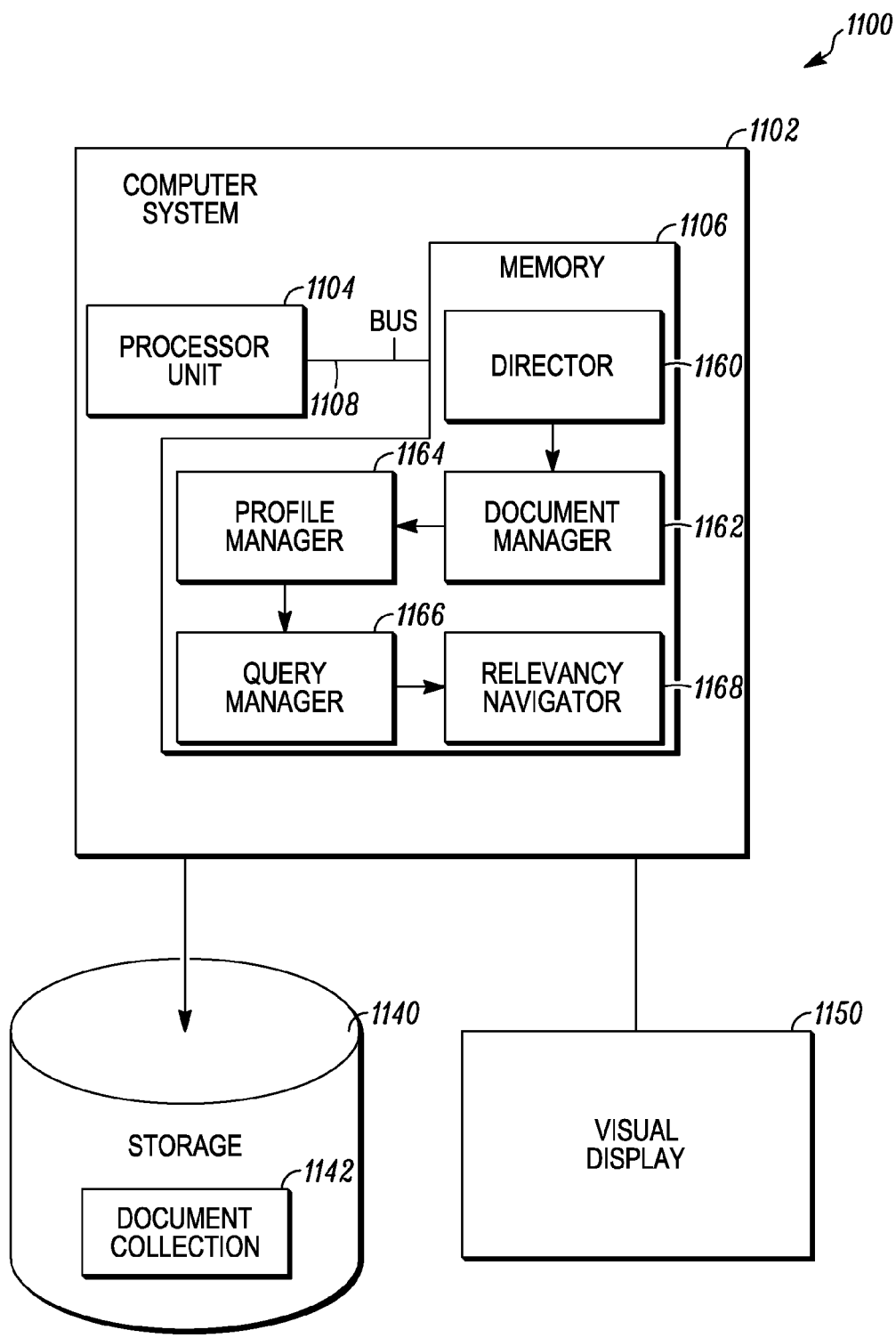
FIG. 11 is a block diagram of a set of tools employed to sort and parse query results of the underlying document collection.

As shown in FIGS. 1-9, a process and/or instructions are employed to submit a query to a document collection, and to parse the collection responsive to the query. However, the invention should not be limited to a process or a set of instructions. In one embodiment, the invention may be comprised of hardware elements in communication with a document collection. FIG. 11 is a block diagram (1100) illustrating a set of tools for sorting and parsing query results into one or more tiers based upon submission of search profiles with the query submission, including assignment of weights to different sections of the intellectual property documents identified in the search profile. As shown, a computer system (1102) is provided with a processor unit (1104) coupled to memory (1106) by a bus structure (1108). Although only one processor unit (1104) is shown, in one embodiment, more processor units may be provided in an expanded design. The system (1102) is shown in communication with storage media (1140) configured to house a document collection (1142). In one embodiment, the electronic document collection includes a compilation of patent documents, including issued patents and published patent applications. The storage media (1140) is in communication with the processor unit (1104). In addition, the system is shown in communication with a visual display (1150) for presentation of visual data. Each of the elements shown and described herein support query submission to the document collection (1142).

A director (1160) is provided local to the computer system (1102) and in communication with memory (1106) and the processor (1104). The director (1160) is responsible for compiling and indexing the document collection (1142). The director (1160) is in communication with a document manager (1162) which identifies each section of each document in the collection. As explained above, in the case of a patent document collection, each patent or published patent application is comprised of specific uniform sections. However, not all patent document collections have a uniform layout. As such, the document manager (1162) is employed to identify the sections of the documents in the collection, and in one embodiment, the order of the presentation of the identified sections. A profile manager (1164) is provided in communication with the document manager (1162). The profile manager (1164) organizes a search profile for the document collection (1142). More specifically, the profile manager (1164) facilitates the selection of one or more sections of the documents, as identified by the document manager (1162) for inclusion in a query, and assigns a weight to each selected section. In one embodiment, the weight is a numerical value to identify the importance of matching data in the selected section(s). Accordingly, the search profile as organized by the profile manager (1164) provides an outline for the sections of the document collection that are pertinent to the query.

A query manager (1166) is in communication with the profile manager (1164), also provided local to the computer system (1102) and in communication with memory (1106). The query manager (1166) is responsible for selection of at least one search profile with submission of a query to the document collection (1142). More specifically, the query manager (1166) compares query data with data in the sections of the document collection (1142) that are identified in the profile and assigned a weight. The query manager (1166) is in communication with a relevancy navigator (1168), which functions to rank the documents in the compilation based upon the relevancy score and to dynamically limit results in the compilation based upon the rank. The comparison as performed by the query manager (1166) together with the employment of the relevancy navigator (1168) yields a compilation of relevant patent documents based upon an applied dynamic limit. In one embodiment, the compilation is presented on the visual display (1150). Similarly, in one embodiment, the compilation may be retained on storage, either volatile or persistent. To facilitate conveyance to the query submitter, the query manager is in communication with a sort manager to rank results of query submissions based in the document sort.

In one embodiment, the director (1160), document manager (1162), profile manager (1164), and query manager (1166), may reside in memory (1106) local to the computer system (1102). However, the invention is not to be limited to this embodiment. For example, in one embodiment, the director, document manager, profile manager, and query manager (1160)-(1166) may each reside as hardware tools external to local memory (1106), or they may be implemented as a combination of hardware and software. Similarly, in one embodiment, the director and managers (1160)-(1166), may reside on a remote system in communication with the storage media (1140). Accordingly, the director and managers may be implemented as a software tool or a hardware tool to support submission of one or more queries to an electronic patent document collection to yield a compilation of relevant patent documents.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

Each intellectual property document is known in the art to have a defined outline of sections that are required to meet statutory filing requirements. One or more profiles are created to facilitate submission of a query to the document collection. Each profile imparts a weight to one or more of the identified sections in the document. The weight represents the importance of the identified section and adds value to each document in the returned compilation. Not all queries are the same. For example, it is recognized that intellectual property documents in the chemical technologies have a limited number of drawing figures, if any. As such, a query in the chemical technology may de-emphasize the drawing figures, and place a greater emphasis on the written text. Different queries are submitted to the collection to achieve different results. Accordingly, the creation of multiple profiles, with each profile employing a different selection of the identified sections, and imparting different weights to the different selected sections, enables a query submission to be efficiently and effectively processed to yield a focused compilation of document results.

Once the profiles are created and at least one profile is selected for a query submission, the next step addresses presentation of the query results in a manner that parallels the selected profile. In one embodiment, the query produces a compilation of documents that are then sorted, and placed in a hierarchical assortment of tiers. This enables the relevancy to be exhibited directly with the query result presentation. In another embodiment, the query results may be further conveyed based upon the sections selected in the profile, wherein a second set of query results are presented based upon individual sections represented in the profile, and a sorting of the documents in each respective section. Accordingly, the profile selection is employed both to generate the query results and to present the query results based upon relevancy in a manner that parallels the selected profile.

Alternative Embodiments

It will be appreciated that, although specific embodiments of the invention have been described herein for purposes of illustration, various modifications may be made without departing from the spirit and scope of the invention. In particular, there are different forms of intellectual property documents, including patents, trademarks, and copyrights. Within the category of patent documents, there is a further breakdown of documents, including issued patents, published patent application, patent abstracts, and utility model registrations. Some of these documents may contain the same quantity of sections in the same order, and others will have a different quantity of sections and/or a different order. The profiles are independently created based upon sections that are present, and not necessarily the order in which they appear in the underlying document.

In addition, the electronic document collection has been specifically described pertaining to intellectual property documents, including issued patents and published patent applications, trademark registrations and application, and copyright registrations and applications. However, the invention should not be limited to these specific categories of electronic documents. In one embodiment, the electronic document collection may include any type of document that has a defined plurality of sections. This would enable the managers to parse the documents into the defined sections, create multiple profiles with associated weights for one or more of the defined sections, and submission of a query to the document collection with a selected profile. As noted above, selection of a query profile may be dynamically modified. In one embodiment, modification of the query profile while maintaining the query content may change the documents returned in the compilation as well as the order of relevancy in which the documents in the compilation are presented. Accordingly, the scope of protection of this invention is limited only by the following claims and their equivalents.

I claim:

1. A computer implemented method for assigning relevancy to results of a search on an electronic document collection comprising:
   compiling and indexing a collection of intellectual property documents, each of the documents in the collection having multiple sections;
   identifying each of the sections of each document in the collection;
   assigning a weight to each of the identified sections;
   organizing a search profile for the document collection based on weights assigned to each of the identified sections, wherein the search profile includes a selection of at least one of the identified sections of each document in the compiled collection;
   at query time, submitting a query to the patent document collection, including selecting at least one search profile, and comparing query data with data in each of the document sections of the selected profile in the collection;
   computing a relevancy score for each document returned in a compilation of documents generated from said query submission;
   ranking the documents in the compilation based upon the computed relevancy score;
   dynamically limiting results in the compilation based upon the ranking;
   sorting relevant documents in the compilation based upon the dynamic limit applied to the compilation; and
   applying a secondary weight to add or subtract from the weight assigned to each of the identified sections based upon a quantity of matching strings in select sections of each profile.

2. The method of claim 1, further comprising dividing the compilation of documents into hierarchical tiers in response to the sorting relevant documents in the compilation.

3. The method of claim 2, further comprising limiting query results obtained in response to selection of the hierarchical tiers.

4. The method of claim 2, further comprising dividing adjacent tiers at an inflection point present in the ranking.

5. The method of claim 1, further comprising applying a secondary rank factor to the first compilation of documents and ranking the sorted compilation based upon the secondary factor.

6. The method of claim 5, wherein said secondary factor is selected from the group consisting of: filing date, publication date, foreign priority date, alphabetical list of title, assignee, and combinations thereof.

7. The method of claim 1, further comprising a second compilation of documents as a subset of the first compilation, and computing a second relevancy score for the subset based upon secondary criteria present in the search profile.

8. The method of claim 7, further comprising separately sorting each subset of documents.

9. The method of claim 8, further comprising dynamically assigning a relevancy limit to the sorted subset and limiting return of query results based upon the assigned relevancy limit.

10. The method of claim 1, further comprising creating a graphical presentation of the first compilation based upon the computed relevancy score and a quantity of documents in the compilation represented at different computed scores.

11. The method of claim 10, further comprising a slider on the graphical presentation for representing a line of demarcation, including the compilation to include all documents referenced on one side of the line and to exclude all documents referenced on another side of the line.

12. The method of claim 1, further comprising applying a curve fitting routine to the first compilation, wherein the routine calculates a theoretical function to data of the first compilation and calculates at least one derivative of the function.

13. The method of claim 12, wherein the step of dynamically limiting results in the compilation includes selecting a derivative of the function and returning data falling within the selected derivative from the function.

14. A system comprising:
a processor in communication with memory and storage media;
a collection of intellectual property documents retained on the storage media, with each of the documents in the collection having multiple sections;
a director in communication with the processor and to compile and index the collection of documents;
a document manager in communication with the director, the document manager to identify each section of each document in the collection;
a profile manager, in communication with the document manager, the profile manager to assign a weight to each of the identified sections;
the profile manager to organize a search profile for the document collection based on weights assigned to each of the identified sections, wherein the search profile includes a selection of at least one of the identified sections of each document in the compiled collection;
at query time, a query manager to submit a query to the document collection, the query to include selection of at least one search profile and comparison of query data with data in each of the document sections of the selected profile in the collection having an assigned weight, said query resulting in a compilation of relevant documents generated from said query submission and returned from the query manager, with each document having a match of the query to data in at least one identified profile section having an assigned weight and a relevancy score;
a relevancy navigator in communication with the query manager, the relevancy navigator to rank the documents in the compilation based upon the relevancy score and to dynamically limit results in the compilation based upon the rank;
the relevancy navigator to sort relevant documents in the compilation based upon the dynamic limit application to the compilation; and
the profile manager to apply a secondary weight to add or subtract from the weight assigned to each of the identified sections based upon a quantity of matching strings in select sections of each profile.

15. The System of Claim 14, Further Comprising a secondary rank factor applied to the first compilation of documents to rank the sorted first compilation based upon the secondary factor.

16. The system of claim 15, wherein the secondary factor is selected from the group consisting of: filing date, publication date, foreign priority date, alphabetical listing of title, assignee, and combinations thereof.

17. The system of claim 16, further comprising a second compilation of documents compiled as a subset of the first compilation and a second relevancy score for the subset based upon each secondary criteria present in the search profile.

18. The system of claim 17, further comprising a sort manager in communication with the relevancy navigator, the sort manager to sort each compilation based upon the second relevancy score.

19. The system of claim 14, further comprising a division of the first compilation of documents into hierarchical tiers based upon the sort of the compilation and a limit of presentation of query results based upon a selection of hierarchical tiers.

20. The system of claim 19, further comprising the relevancy navigator to divide adjacent tiers at an inflection point present in the rank.

21. The system of claim 14, further comprising a graphical presentation of the first compilation based upon the computed relevancy score and a quantity of documents in the compilation represented at different computed scores.

22. The system of claim 21, a tool configured to communication with the graphical presentation, wherein the tool dynamically sets a line of demarcation for compilation results to include all documents reference on a first side of the line and to exclude all documents reference on a second side of the line.

23. The system of claim 14, further comprising instructions to execute on the processor a curve fit routine to the first compilation, the routine to calculate a theoretical function to data of the first compilation and to calculate at least one derivative of the function.

24. The system of claim 23, further comprising the relevancy navigator to limit results in the first compilation within a select derivative of the function, and to return data that falls within the selected function derivative.

25. An article configured to assign relevancy to results of a search on an electronic patent document collection on computer memory, the article comprising:
a tangible computer-readable medium including computer program instructions to perform a relevancy assignment, the instructions comprising:
instructions to compile and index a collection of intellectual property documents, each of the documents in the collection having multiple sections;
instructions to identify each of the sections of each document in the collection;
instructions to assign a weight to each of the identified sections;
instructions to organize a search profile for the document collection based on weights assigned to each of the identified sections, wherein the search profile includes a selection of at least one of the identified sections of each document in the compiled collection;
instructions to submit a query to the patent document collection at query time, including selection of at least one search profile, and comparison of query data with data in each of the document sections of the selected profile in the collection; and
instructions to compute a relevancy score for each document returned in a compilation of documents generated from the query submission and to rank the documents in the compilation based upon the computed relevancy score;
instructions to dynamically limit results in the compilation based upon the rank;
instructions to sort relevant documents in the compilation based upon the dynamic limit applied to the compilation; and
instructions to apply a secondary weight to add or subtract from the weight assigned to each of the identified sections based upon a quantity of matching strings in select sections of each profile.

26. The article of claim 25, further comprising instructions to apply a secondary rank factor to the first compilation of documents and to rank the sorted first compilation based upon the secondary factor.

27. The article of claim 26, wherein the secondary factor is selected from the group consisting of: filing date, publication date, foreign priority date, alphabetical listing of title, assignee, and combinations thereof.

28. The article of claim 25, further comprising instructions to compile a second compilation of documents as a subset of the first compilation based upon secondary criteria present in the search profile.

29. The article of claim 28, further comprising instructions to computer a second relevancy score for the subset.

30. The article of claim 28, further comprising instructions to sort the second compilation of documents based upon the second relevancy score.

31. The article of claim 25, further comprising instructions to divide the compilation of documents into hierarchical tiers based upon the sort of the compilation, and to limit presentation of the query results based upon a selection of hierarchical tiers.

32. The article of claim 25, further comprising the instructions to divide adjacent tiers at an inflection point present in the rank.

33. The article of claim 25, further comprising a graphical presentation of the first compilation based upon the computed relevancy score and a quantity of documents in the compilation represented at different computed scores, and instructions to communicate with the graphical presentation, wherein the instructions dynamically set a line of demarcation for compilation results to include all documents reference on a first side of the line and to exclude all documents reference on a second side of the line.

34. The article of claim 25, further comprising instructions to execute a curve fit routine to the first compilation, the routine to calculate a theoretical function to data of the first compilation and to calculate at least one derivative of the function.

35. The article of claim 34, further comprising instructions to limit results in the first compilation within a select derivative of the function, and to return data that falls within the selected function derivative.

* * * * *

UNITED STATES PATENT AND TRADEMARK OFFICE
CERTIFICATE OF CORRECTION

PATENT NO. : 8,364,679 B2
APPLICATION NO. : 12/561516
DATED : January 29, 2013
INVENTOR(S) : Jason David Resnick It is certified that error appears in the above-identified patent and that said Letters Patent is hereby corrected as shown below:

In the Specification:

In column 2, line 32, delete "ranking" and insert -- ranking. --, therefor.

In column 12, line 63, delete "teirs" and insert -- tiers --, therefor.

In the Claims:

In column 19, line 56, in claim 15, delete "The System of Claim 14, Further Comprising" and insert -- The system of claim 14, further comprising --, therefor.

Signed and Sealed this
First Day of October, 2013

Teresa Stanek Rea
*Deputy Director of the United States Patent and Trademark Office*